United States Patent [19]
Russay et al.

[11] Patent Number: 5,008,658
[45] Date of Patent: Apr. 16, 1991

[54] DOMED LIGHT HOUSING FOR BACK-LIT LCD DISPLAY

[75] Inventors: Thomas Russay, Park Ridge; Carl W. Stacy, Elmwood Park, both of Ill.

[73] Assignee: Zenith Electronics Corporation, Glenview, Ill.

[21] Appl. No.: 939,668

[22] Filed: Dec. 9, 1986

[51] Int. Cl.$^5$ .............................................. G09G 3/36
[52] U.S. Cl. .................................... 340/784; 350/345
[58] Field of Search ........... 340/765, 784, 716, 815.06, 340/815.07, 815.31; 350/345; 362/23, 26, 27, 29, 30, 31, 247; 40/451, 452, 541, , 544, 901

[56] References Cited

U.S. PATENT DOCUMENTS

| | | | |
|---|---|---|---|
| 3,966,303 | 6/1976 | Yamamoto | 350/345 |
| 4,555,694 | 11/1985 | Yanagishima et al. | 362/31 |
| 4,659,183 | 4/1987 | Suzawa | 350/345 |
| 4,723,840 | 2/1988 | Humbert et al. | 350/345 |

OTHER PUBLICATIONS

IBM Technical Disclosure Bulletin by Young, vol. 15, No. 8, Jan. 8, 1973, pp. 2435–2436.

Primary Examiner—Jeffery A. Brier

[57] ABSTRACT

A housing having a generally rectangular cross section includes apertured front and lower portions which are respectively adapted to receive a liquid crystal display (LCD) and a plurality of light emitting diodes (LEDs) and which are oriented so as to face generally transversely relative to one another. Disposed within the housing between its front and lower portions are facing convex and concave inner walls which form a light channel between the LEDs and LCDs. With the LCDs and LEDs respectively positioned within the apertured front and lower portions of the housing and mounted thereto, the facing inner walls of the housing direct light from the LEDs onto the aft, inner surface of the LCDs in a diffuse, uniform manner which provides backlighting for the LCDs and prevents direct viewing of the LEDs from in front of the LCDs thus eliminating LED hot spots. The housing is comprised of two plastic sections adapted for secure snap-acting engagement and is provided with a semi-rough interior surface for diffuse reflection of the LED-emitted light.

15 Claims, 2 Drawing Sheets

DOMED LIGHT HOUSING FOR BACK-LIT LCD DISPLAY

BACKGROUND OF THE INVENTION

This invention relates generally to electronic video displays for presenting visual information such as in the form of alphanumeric characters and is particularly directed to a liquid crystal display (LCD) with light emitting diode (LED) backlighting.

User interactive devices typically provide status information to the user and, in turn, require user-initiated inputs for proper operation. These types of devices range from television receivers to remotely located, automatic banking, or cash, stations. The information provided to the user is generally in the form of alphanumeric characters. The display of this information may be continuous such as the selected channel of a television receiver or it may be periodic such as the current time. Regardless of the nature and type of information displayed, the display should provide information which is easily readable under a wide range of environmental conditions. Two of the more common types of displays make use of LCDs and LEDs. LCDs have the advantage of reduced cost, simpler installation, longer lifetime, and reduced power requirements. However, an LCD display suffers from the limitation that it is not visible in the dark and thus requires auxiliary lighting for night viewing. To this end, LCDs have been used in combination with incandescent bulbs as well as with LEDs which provide backlighting for LCD viewing in the dark. LEDs require less power and offer longer operating lifetimes than conventional incandescent bulbs.

Prior art LED backlighting arrangements for LCDs have suffered from various limitations. For example, the LEDs are typically positioned directly aft of the LCDs, causing the LEDs to appear as "hot spots" when the LCDs are viewed from the front. Other LED backlighting arrangements have made use of the light diffusing and internal reflection characteristics of transparent plastics such as plexiglass or Lucite. In this approach, the LEDs are positioned within recessed slots along an edge of the transparent plastic sheet which is aligned generally parallel to the plane of the LCDs. Internal reflection of the LED light within the plastic sheet which generally includes an angled outer surface results in the projection of the light within the plastic sheet onto the aft surface of the LCDs. While permitting the LCD display to be viewed in the dark, this approach requires that the LEDs extend beyond the periphery of the LCD display and thus requires considerable mounting space. In addition, the LED light exits the plastic sheet from surfaces other than the surface which is in facing relation to the LCD display, resulting in loss of some of the LED light and reduced backlighting efficiency.

The present invention overcomes the aforementioned limitations of the prior art by providing a domed light housing for an LCD display which is backlit by a plurality of LEDs. The housing confines all of the light emitted by the LEDs in forming a light conduit and directs this light onto the rear surface of the LCDs to provide backlighting for the LCDs when viewed from the front, wherein the LEDs are not directly visible from in front of the LCD display to eliminate LED "hot spots".

OBJECTS OF THE INVENTION

Accordingly, it is an object of the present invention to provide improved viewing for an LCD display.

It is another object of the present invention to provide for viewing an LCD display in the dark using LED backlighting.

It is another object of the present invention to backlight an LCD display with LEDs without the presence of backlighting hot spots.

A still further object of the present invention is to provide an LCD/LED display arrangement wherein virtually all of the light produced by a plurality of LEDs is projected onto the rear surface of an LCD display in providing efficient backlighting therefor.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
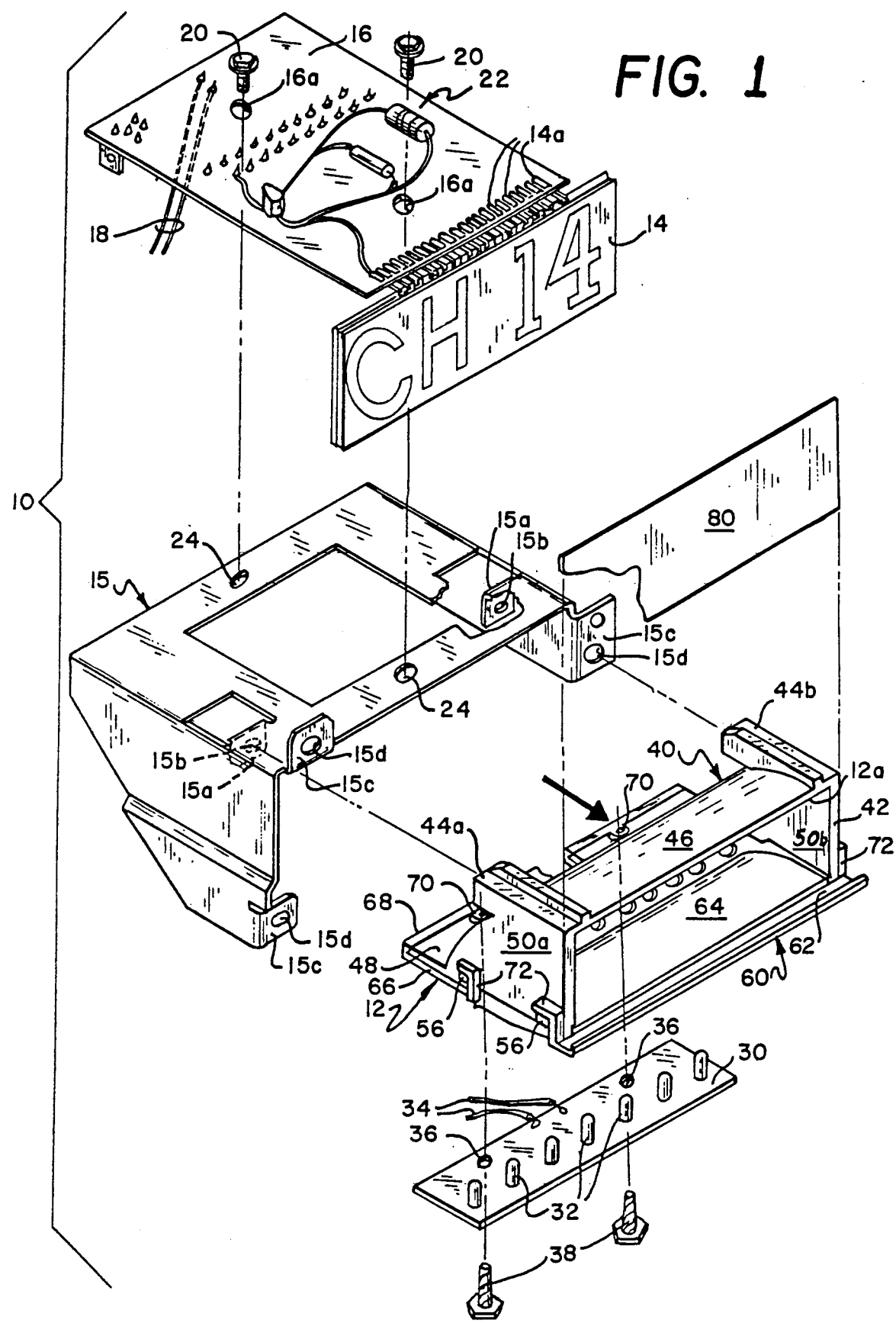
FIG. 1 is an exploded perspective view of a video display incorporating a domed light housing for a backlit LCD display in accordance with the present invention.
Figure 2:
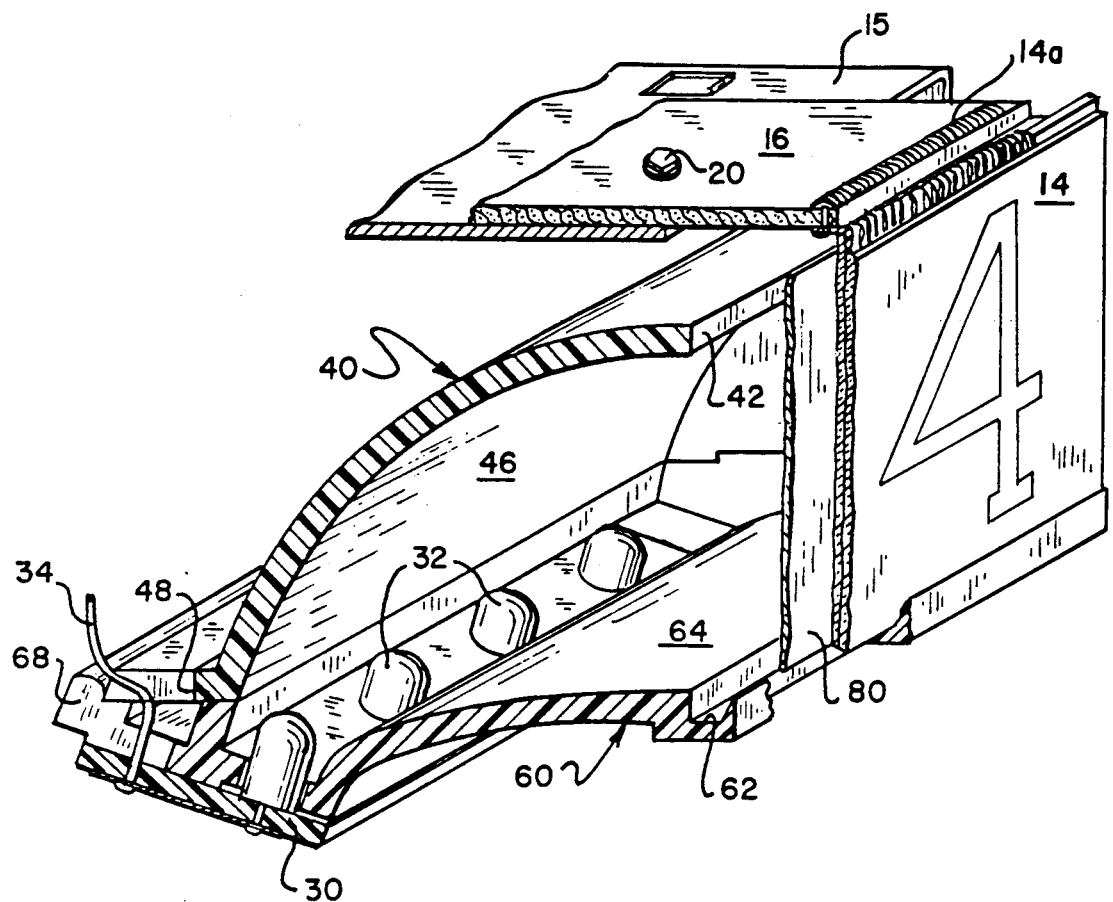
FIG. 2 is a cutaway lateral view of the domed light housing used in the back-lit LCD display of FIG. 1.

Referring to FIG. 1, there is shown an exploded perspective view of an LCD display with LED backlighting 10 incorporating a domed light housing 12 in accordance with the present invention. FIG. 2 is a lateral sectional view of the domed light housing 12 of FIG. 1.

The LCD display with LED backlighting 10 includes a generally planar LCD display 14 coupled by means of a plurality of conductors 14a to the circuitry 22 on a first PC board 16. PC board 16 includes the necessary circuitry 22 for driving the LEDs and the connections for the various segments of the alphanumeric characters of the LCD display 14. The pair of conductive leads 18 couples the circuitry 22 on the PC board 16 to appropriate energizing means (not shown). The generally planar LCD display 14 and PC board 16 are oriented generally transversely relative to one another. The PC board 16 is provided with a plurality of apertures 16a through each of which a respective threaded mounting pin 20 may be inserted for securely attaching the PC board to an upper surface of a mounting bracket 15. Mounting bracket 15 is also provided with a plurality of matching apertures 24, each of which is adapted to receive a respective threaded mounting pin 20 by means of which the combination of the PC board and LCD display 14 may be securely attached to the mounting bracket 15.

The mounting bracket 15, which is preferably comprised of metal, includes a first pair of mounting flanges 15a, each of which is provided with a respective aperture 15b therein. The first pair of mounting flanges 15a are positioned on an inner, upper portion of the mounting bracket 15, with the respective apertures 15b therein adapted to receive a threaded mounting pin (not shown) for securely attaching the housing 12 to the mounting bracket 15 as described in detail below. Disposed on a forward portion of the mounting bracket 15 are a plurality of spaced mounting flanges 15c, each of which includes a respective aperture 15d therein. Each of the apertures 15d is adapted to receive a threaded mounting pin (not shown) for securely attaching the mounting flanges 15c as well as the mounting bracket 15 to a support structure (not shown) such as a chassis or cabinet of a television receiver. In this manner, the mounting bracket 15 as well as the housing 12 and associated display electronics may be securely mounted to virtually any support structure.

The housing 12 includes a generally rectangular front aperture 12a and is comprised of an upper housing section 40 and a lower housing section 60. The upper housing section 40 includes a forward edge 42 comprised of first and second lateral, generally vertical lengths and a horizontal length coupling the two lateral lengths. The upper housing section further includes an upper, curvilinear panel 46 having first and second mounting flanges 44a, 44b positioned on upper, lateral portions thereof. Positioned on the end portions of the upper, curvilinear panel 46 are first and second generally vertically oriented lateral panels 50a and 50b. The upper housing section 40 further includes a planar aft portion 48 which is continuous with and extends rearward from the upper curvilinear panel 46. The aft portions of each of the first and second mounting flanges 44a, 44b are provided with a respective aperture which is adapted for receiving a coupling pin (not shown) inserted through the apertures 15b in each of the mounting flanges 15a of the mounting bracket 15. It is in this manner that the upper housing section 40 of the housing 12 may be securely mounted to and suspended from the mounting bracket 15.

With the first PC board 16 attached to mounting bracket 15 by means of the threaded mounting pins 20, the forward edge 42 of the upper housing section 40 of the housing 12 is adapted to receive in tight fitting engagement peripheral edge portions of the LCD display 14. The lower housing section 60 includes a recessed forward edge 62 which is adapted to receive the lower edge portion of the LCD display 14 and to securely maintain the display in contact with the forward edge 42 of the housing 12 so as to cover the front aperture 12a therein. In some embodiments of the present invention, a colored transparent background panel 80 may be disposed between the LCD display 14 and the forward edge 42 of the upper housing section 40 and within the recessed forward edge or slot 62 in the lower housing section 60. By providing the translucent background panel 80 with a selected color, the LCD display 14 may be provided with a range of background color for improved viewability and appearance of the LCD alphanumeric characters.

The lower housing section 60 is provided with an intermediate curvilinear portion 64 and a planar rear portion 66 which is continuous with and extends from the intermediate curvilinear portion. The planar rear portion 66 includes an aft edge 68 which is adapted to receive in tight fitting engagement the rear edge of the planar aft portion 48 of the upper housing section 40. The planar rear portion 66 of the lower housing section 60 and the planar aft portion 48 of the upper housing section 40 are each provided with a respective plurality of aligned apertures 70, which apertures are further aligned with the apertures 36 in a second PC board 30 when positioned in contact with the planar rear portion 66 of the lower housing section 60. Inserted through the aforementioned aligned apertures for securely attaching the second PC board 30 to the planar, rear portion of the lower housing 60 are a plurality of threaded mounting pins 38.

Positioned on each facing lateral edge of the lower housing section 60 are a pair of spaced locking flanges 72. Each of the four locking flanges 72 extends upward from the lower housing section 60 and is generally in the form of an inverted "L". The upper housing section 40 is adapted for insertion between the facing pairs of locking flanges 72 on respective lateral edge portions of the lower housing section 60. Positioned on the outer surfaces of each of the lateral panels 50a, 50b of the upper housing section 40 are a pair of coupling bosses 56. When the upper housing section 40 is inserted between the pairs of locking flanges 72 such that the lower edge portions of its lateral panels 50a, 50b engage and slide along the upper surface of the lower housing section 60 from rear to front, or in the direction of the arrow in FIG. 1, the coupling bosses 56 on the lateral panels are adapted for positioning beneath and in engagement with a respective locking flange 72. Thus, the upper housing section 40 may be securely coupled to the lower housing section 60 in a snap-acting manner by positioning the lower edge portions of the upper housing section in intimate contact with the upper, peripheral edge portion of the lower housing section such that each of the coupling bosses 56 is positioned immediately aft of a corresponding locking flange 72. The upper housing section 40 is then displaced along the lower housing section 60 in a forward direction such that each of the coupling bosses 56 is positioned beneath and in secure engagement with an associated locking flange 72. When this occurs, the rear edge of the planar aft portion 48 of the upper housing section 40 will be positioned in secure engagement with the aft edge 68 of the planar rear portion 66 of the lower housing section 60. With the rear edge of the planar aft portion 48 provided with a beveled configuration and the aft edge 68 of the planar rear portion 66 of the lower housing section 60 provided with a complementary beveled configuration, the rear portion of the upper housing section will be maintained in secure engagement along the length thereof with a corresponding rear portion of the lower housing section 60. The complementary beveled configurations of the rear edges of each of the upper and lower housing sections 40, 60 permits these two sections to be securely coupled and de-coupled in a snap-acting manner, since the housing 12 including its upper and lower sections is preferably comprised of a hard, opaque, resilient plastic.

Figure 3:
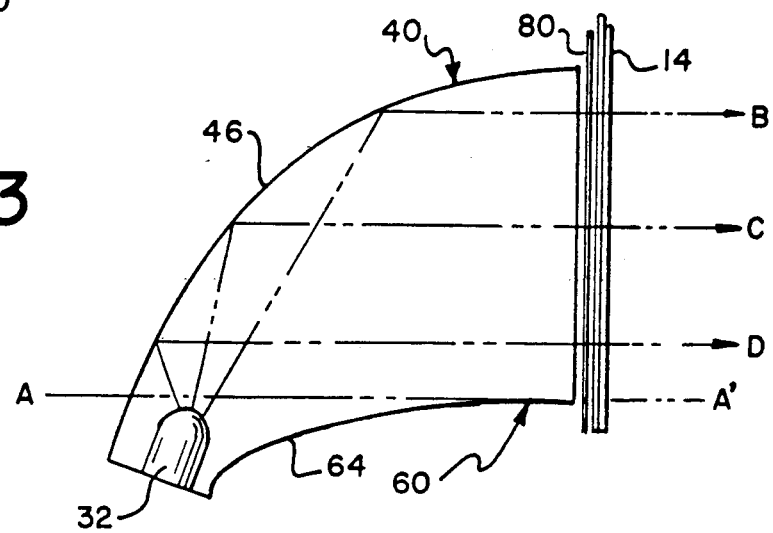
FIG. 3 is a simplified lateral sectional view of the domed light housing of the present invention illustrating the manner in which light emitted by the LEDs is reflected by the domed light housing onto the rear surface of and through an LCD display.

The planar rear portion 66 of the lower housing section 60 is provided with a plurality of apertures each adapted to receive a respective LED 32 positioned upon and electrically coupled to the second PC board 30 by a pair of conductive leads 34 when the second PC board is mounted to the lower, aft portion of the housing 12. When positioned in a respective aperture in the planar rear portion 66 of the lower housing section 60, the LEDs 32 extend above the upper, inner surface of the lower housing section. The curvilinear configuration of the upper panel 46 of the upper housing section 40 is such as to reflect light emitted from the LEDs 32 onto the aft surface of the LCD display 14 as shown in FIG. 3. In a preferred embodiment, the inner surface of the upper curvilinear panel 46 is provided with a semi-rough texture so that the LED light is reflected therefrom in a diffuse manner. By diffusely reflecting the LED light incident thereon, the inner surface of the upper curvilinear panel 46 eliminates "hot spots" on the LCD display 14 when viewed from the front, which "hot spots" arise from direct projection of the image of an LED on the aft surface of the LCD display. The various light rays emitted from the LEDs 32 are represented by the letters B, C and D in FIG. 3.

The intermediate curvilinear portion 64 of the lower housing section 60 also serves to remove the LEDs 32 from direct viewing from in front of the LCD display 14. By positioning the LEDs 32 below the line designated A-A' in FIG. 3, which line represents the lower edge portion of the illuminated LCD display 14, the LEDs are hidden from direct view when the LCD display is viewed from in front of the housing 12. Although the LEDs 32 may be directly viewed through the LCD display 14 by looking downward on the LCD display, this is not the normal position of the LCD display relative to a viewer since the LCD display is typically oriented generally vertically. Thus, with the housing 12 typically located at approximately eye level with respect to a viewer, positioning of the LEDs 32 below the LCD display 14 prevents direct viewing of the LEDs through the LCD display.

There has thus been shown an LCD display with LED backlighting using a plastic housing which prevents direct viewing of the LEDs from in front of the LCD display and thus eliminates "hot spots" associated therewith. All of the light emitted by the LEDs is directed onto an aft surface of the LCD display by means of a concave, opaque inner surface of the housing which includes two sections which may be easily assembled/-disassembled in a snap-acting manner. The housing provides a compact, inexpensive, and high strength mounting arrangement for the LCD display.

While particular embodiments of the present invention have been shown and described, it will be obvious to those skilled in the art that changes and modifications may be made without departing from the invention in its broader aspects. For example, while the invention has been described in terms of positioning the LEDs below the LCD display as viewed from the front, the LEDs may also be positioned either above or to the side of the LCD display by providing the housing with an appropriately curved pair of inner facing reflective surfaces. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A video display arrangement comprising:
a generally planar LCD display having an aft surface, a forward viewed surface, and a plurality of peripheral edges;
at least one LED; and
a hollow housing having an empty aperture extending therethrough and including an open forward section whereon is positioned said LCD display, an aft section for receiving said at least one LED, and a curvilinear intermediate section coupling said forward section to said aft section, wherein said at least one LED is positioned aft of and beyond a peripheral edge of said LDC display in an off-set manner and in non-alignment therewith such that light emitted by said at least one LED is transmitted through said empty aperture and is reflected by the curvilinear intermediate section of said housing onto the aft surface of said LCD display in providing backlighting therefor, wherein said housing includes first and second facing lateral panels and facing concave and convex panels coupled at respective adjacent ends to said first and second facing lateral panels so as to define said empty aperture.

2. The video display arrangement of claim 1 wherein the aft section of said housing includes an aperture for receiving and positioning said at least one LED in said housing.

3. The video display arrangement of claim 2 wherein said at least one LED is positioned below a lower peripheral edge of said LCD display.

4. The video display arrangement of claim 3 further including a PC board mounted to the aft section of said housing and coupled to said at least one LED for mounting and illuminating said at least one LED.

5. The video display arrangement of claim 1 wherein said facing concave and convex panels include respective complementary aft edge portions adapted for mutual engagement in coupling said concave and convex panels together.

6. The video display arrangement of claim 5 wherein said first and second facing lateral panels are coupled to and integral with said concave panel and are adapted to engage in tight-fitting relation respective lateral edge portions of said convex panel.

7. The video display arrangement of claim 6 wherein said first and second facing lateral panels each include a respective coupling boss and respective ends of said convex panel each include a respective locking flange on a lateral edge thereof adapted to engage a respective coupling boss in securely coupling said concave and convex panels in a snap-acting manner.

8. The video display arrangement of claim 1 wherein said LCD display and the open forward section of said housing are generally rectangular and wherein said LCD display is disposed in intimate contact with the open forward section of said housing around the periphery thereof.

9. The video display arrangement of claim 8 wherein the open forward section of said housing includes a recessed forward edge having an elongated, linear groove therein for engaging an edge of said LCD display substantially along the length thereof.

10. The video display arrangement of claim 1 further including a mounting bracket coupled to the housing for mounting the video display arrangement to a support structure.

11. The video display arrangement of claim 10 further including a PC board coupled to said LCD display for energizing said LCD display.

12. The video display arrangement of claim 11 further including coupling means for attaching the PC board to said mounting bracket.

13. The video display arrangement of claim 1 including a plurality of LEDs wherein the aft section of said housing includes a plurality of apertures for receiving and positioning said LEDs in said housing.

14. The video display arrangement of claim 1 wherein said housing is comprised of an opaque plastic having a semi-rough inner surface for diffusely and uniformly reflecting light emitted by said at least one LED onto the aft surface of said LCD display.

15. The video display arrangement of claim 1 further including a translucent colored background panel disposed immediately aft of said LCD display.

* * * * *